United States Patent [19]

Lösel

[11] Patent Number: 4,694,388
[45] Date of Patent: Sep. 15, 1987

[54] SYNCHRONIZER FOR COMMONLY CLOCKED CONVERTERS

[75] Inventor: Walter Lösel, Fürth, Fed. Rep. of Germany

[73] Assignee: U.S. Philips Corporation, New York, N.Y.

[21] Appl. No.: 892,602

[22] Filed: Aug. 4, 1986

[30] Foreign Application Priority Data

Aug. 10, 1985 [DE] Fed. Rep. of Germany ....... 3528766

[51] Int. Cl.$^4$ ............................................. H02M 11/00
[52] U.S. Cl. ......................................... 363/72; 363/71
[58] Field of Search .................................... 363/71, 72

[56] References Cited

U.S. PATENT DOCUMENTS 4,276,590 6/1981 Hansel et al. ......................... 363/71

FOREIGN PATENT DOCUMENTS 3223179 12/1983 Fed. Rep. of Germany .

Primary Examiner—Patrick R. Salce
Assistant Examiner—Jeffrey Sterrett
Attorney, Agent, or Firm—Robert T. Mayer; Bernard Franzblau

[57] ABSTRACT

Apparatus for synchronizing the oscillators of several clocked direct voltage converters where each direct voltage converter has a control circuit with the oscillator as an integrated component and each control circuit has a connection for a capacitor and a connection for a resistor for defining the oscillator frequency. Commercial elements TDA 4714 and TDA 4716 are preferred as the control circuit. The synchronization is attained by adjusting the frequency of the oscillator of a first direct voltage converter to be higher than the frequency of the oscillators of the remaining direct voltage converters. A pulse sequence with an impulse frequency proportional to the oscillator frequency of the first direct voltage converter is transmitted by the first direct voltage converter to all of the other converters through an element that provides isolation between the different potentials. The pulses of the pulse sequence adjust a predetermined charging state for the capacitors of the other direct voltage converters. The adjustment is repeated at the frequency of the oscillator of the first direct voltage converter.

7 Claims, 1 Drawing Figure

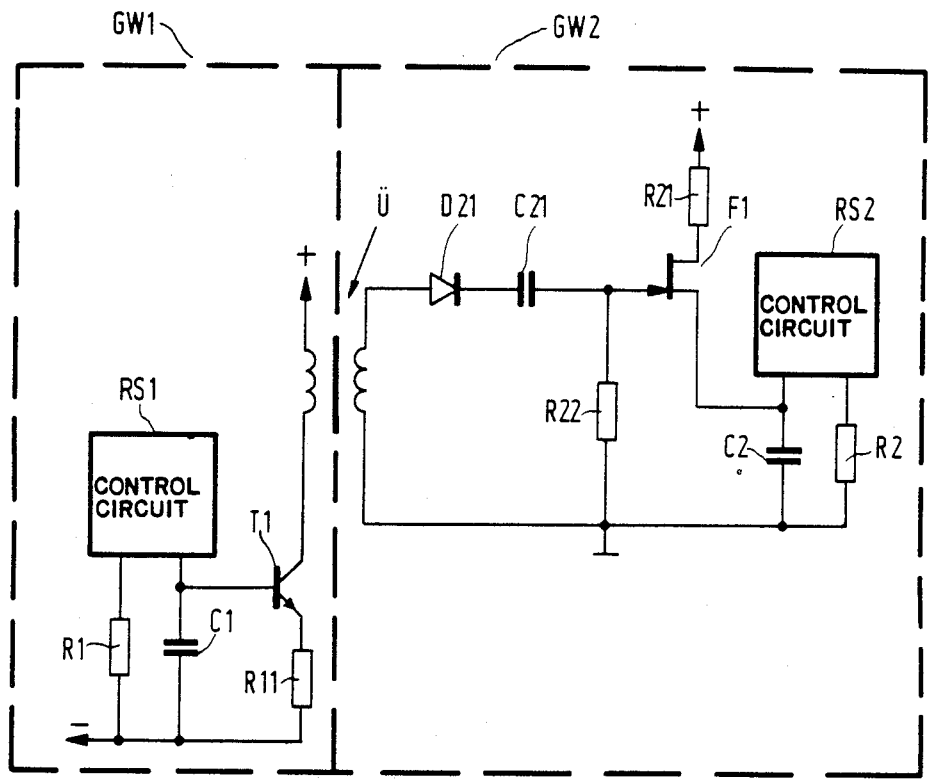

SYNCHRONIZER FOR COMMONLY CLOCKED CONVERTERS

BACKGROUND OF THE INVENTION

This invention relates to an arrangement for synchronising the oscillators of several clocked direct voltage converters each having a control circuit, in which the oscillator is included as an integrated element and in which the control circuit has a connection for a capacitor and a connection for a resistor for defining the frequency of the oscillator.

In the manufacture of clocked direct voltage converters, commercially available elements are used more and more frequently, which are designated hereinafter as control circuits. A control circuit comprises inter alia as an integrated component—more particularly the elements TDA 4714 and TDA 4716 are considered—an oscillator whose frequency can be adjusted by a capacitor and a resistor which are externally provided. In case of operation under no-load conditions, a sawtooth voltage is developed across the capacitor in which the duration of the rising edges is defined by the value of the resistor and the duration of the falling edges is defined by the capacitance value of the capacitor. With the frequency of the oscillator, the switching frequency for the switching transistor of the direct voltage converter is also defined, which is driven by an output signal of the control circuit. The equidistant positive edges of this output signal determine the switching-on instants of the switching transistor and hence the instants at which a loading of the voltage source on the primary side of the converter begins and at which simultaneously arise small voltage decreases on the lead between the voltage source and the direct voltage converter. If several direct voltage converters are connected through the same lead to the voltage source, voltage fluctuations are produced at the lead, whose composition as to frequency appears from the modulation of all voltage fluctuations, which are produced from the individual direct voltage converters. These modulation products have to be suppressed by filters in order that other loads connected to the same lead are not disturbed.

The modulation products can be suppressed with complicated filtering means only if the oscillators of the individual direct voltage converters do not oscillate at the same frequency. This is the case, for example, if all the oscillators of the direct voltage converters are nominally adjusted to the same frequency, it is true, but oscillate at different frequencies because of the inevitable deviations from the nominal frequency. The suppression of the modulation products practically becomes useless as soon as thermal effects lead to fluctuations in time of the frequency of each of the oscillators. Therefore, the oscillators of the direct voltage converters have to be synchronised.

The synchronization does not involve any problem as long as the control circuit of the direct voltage converters is composed of single elements. As described, for example, in DE OS 3223179, one oscillator can then be used for all direct voltage converters.

If, however, the aforementioned integrated control circuits are utilized, synchronization is not possible without further expedients because, for example, the manufacturers of these control circuits have not provided for the synchronization of several oscillators.

Additional considerations are to be made if, for example, the oscillators of direct voltage converters should be synchronized, the potential of whose primary side is isolated from that of the secondary side and whose control circuits manufactured according to the integrated technology are arranged in some direct voltage converters on the primary side and in some direct voltage converters on the secondary side.

SUMMARY OF THE INVENTION

Therefore, an object of the invention is to provide a circuit arrangement of the kind mentioned in the opening paragraph in which the potentials of the oscillators of the individual direct voltage converters are insulated from each other.

This object is achieved in that the frequency of the oscillator of a first direct voltage converter is adjusted so as to be higher than the frequency of the oscillators of all the remaining direct voltage converters, in that a pulse sequence, whose impulse frequency is proportional to the frequency of the oscillator of the first direct voltage converter, is transmitted by the first direct voltage converter through an element providing the isolation between the potentials to all of the remaining direct voltage converters, in that by means of the pulses of the pulse sequence a predetermined charging state is adjusted for the capacitor of the control circuits of all the remaining direct voltage converters, and in that the adjustment is repeated with the frequency of the oscillator of the first direct voltage converter.

BRIEF DESCRIPTION OF THE DRAWING

Advantageous embodiments of the invention are indicated in the various claims. An embodiment of the invention will be described more fully with reference to the sole FIGURE of the drawing. This FIGURE shows the components essential to the invention in the case of two direct voltage converters.

DESCRIPTION OF THE PREFERRED EMBODIMENT

The control circuit RS1 of a first direct voltage converter GW1 is provided, at the connections arranged for this purpose, with a resistor R1 and a capacitor C1. By means of these elements, the frequency of the internal oscillator of the control circuit RS1 is adjusted. Across the capacitor C1, a saw-tooth voltage is developed in which the duration of the rising edges is determined by the value of the resistor R1 and the duration of the falling edges is determined by the capacitance value of the capacitor C1. If the voltage at the capacitor C1 exceeds a threshold provided by the manufacturer of the control circuit RS1 and defined by measures with regard to the internal circuitry, the discharging process of the capacitor C1 begins.

The same processes would be effected—if no coupling were present to the direct voltage converter GW1—at a capacitor C2 of a control circuit RS2 of a second direct voltage converter GW2. A resistor R2, which defines the duration of the rising edges of the voltage across the capacitor C2, is chosen so that the rise takes place more slowly than at the capacitor C1 of the direct voltage converter GW1. The frequency of the internal oscillator of the control circuit RS2 is consequently adjusted so as to be lower than the frequency of the oscillator of the control circuit RS1. Frequency deviations of 20% have proved to be favourable. Similar frequency adjustments would have to be effected for further direct voltage converters if their oscillators should also be synchronized with the oscillator of the first direct voltage converter GW1.

One connection of the capacitor C1 is connected to the base and the other connection is connected through an emitter resistor R11 to the emitter of an npn transistor T1. The collector of the transistor T1 is connected through the primary winding of a transformer Ü to the plus terminal + of a voltage source, not shown further. If the voltage at the capacitor C1 exceeds a threshold determined inter alia by the emitter resistor R11, the collector-emitter path of the transistor T1 becomes conducting. The current pulse thus generated leads to a voltage pulse across the secondary coil of the transformer Ü, which is applied to the direct current potential of the control circuit RS2 of the second direct voltage converter GW2. By means of an RC differentiating element C21, R22, the voltage pulse on the secondary side of the transformer Ü is shortened. Since the differentiating element C21, R22 produces per pulse across the secondary coil two shortened pulses, whose polarity is oppositely directed, one of these shortened pulses is suppressed by a diode D21. The sequence of the remaining pulses, whose impulse frequency is equally as high as the frequency of the oscillator included in the control circuit RS1, is supplied to the gate connection of a field effect transistor F1. Its drain connection is connected through a resistor R21 to the plus terminal + of a voltage source, also not shown further, and its source connection is connected to a connection of the capacitor C2. A shortened pulse renders the drain-source path of the transistor F1 conducting, which leads to the capacitor C2 being immediately charged, i.e. to above the threshold determined by the internal circuitry. The result is that now the charging process of the capacitor C2 begins. Thus, the synchronization—but for an indefinite phase difference—of the oscillators of the direct voltage converters GW1 and GW2 is forced.

If the oscillators of further direct voltage converters should also be synchronized with the oscillator of the direct voltage converter GW1, and if also an isolation between the potentials of all control circuits of the direct voltage converters is required, the transformer Ü may be provided with further secondary coils and circuits identical to the circuit shown in the FIGURE will then be connected to each secondary coil.

If no further potential isolation is required, further field effect transistors can be driven by the pulse potential applied to the junction point between the capacitor C21 and the resistor R22, through which transistors the capacitors of the further control circuits are then charged.

What is claimed is:

1. An arrangement for synchronizing the oscillators of several clocked direct voltage converters each having a control circuit with the oscillator included as an integrated element, each control circuit having a connection for a capacitor and a connection for a resistor with the capacitor and resistor defining the frequency of its oscillator, characterized in that the frequency of the oscillator of a first direct voltage converter is adjusted to be higher than the frequency of the oscillators of all other direct voltage converters, means for transmitting a pulse sequence, whose impulse frequency is proportional to the frequency of the oscillator of the first direct voltage converter, from the first direct voltage converter through an element providing voltage isolation to all of the other direct voltage converters, wherein the pulses of the pulse sequence adjust a predetermined charging state for the capacitors of the control circuits of all the other direct voltage converters, and wherein the adjustment is repeated at the frequency of the oscillator of the first direct voltage converter.

2. An arrangement as claimed in claim 1, characterized in that the element providing the isolation between the potentials comprises a transformer.

3. An arrangement as claimed in claim 2, characterized in that the element providing the voltage isolation comprises a transformer.
former and in that the switch is closed when the voltage across the capacitor of the control circuit of the first direct voltage converter exceeds a threshold value.

4. An arrangement as claimed in claim 3, characterized in that the controllable switch comprises an npn transistor having an emitter resistor and in that the capacitor of the control circuit of the first direct voltage converter is connected parallel to the series arrangement of the base-emitter path and the emitter resistor of the npn transistor.

5. An arrangement as claimed in claim 3, characterized in that a secondary winding of the transformer is coupled to a rectifier diode which is coupled in turn to a differentiating element.

6. An arrangement as claimed in claim 5, characterized in that the RC differentiating element supplies output pulses to a further controllable switch which is closed thereby to provide a conduction path for the capacitor of the control circuit of at least one other direct voltage converter, which capacitor is charged to above a predetermined threshold.

7. An arrangement as claimed in claim 6, characterized in that the further controllable switch comprises a field effect transistor.

* * * * *

UNITED STATES PATENT AND TRADEMARK OFFICE
CERTIFICATE OF CORRECTION

PATENT NO. : 4,694,388
DATED : September 15, 1987
INVENTOR(S) : Walter Losel

It is certified that error appears in the above-identified patent and that said Letters Patent is hereby corrected as shown below:

IN THE CLAIMS

Claim 2, line 2      after "providing the" insert --voltage--;

lines 2 & 3,      cancel "between the potentials".

Claim 3, line 2      cancel "the element providing the voltage isolation"

line 2      after "that" insert --a conduction path of a controllable switch is connected in series with a primary winding of the transformer--

UNITED STATES PATENT AND TRADEMARK OFFICE
CERTIFICATE OF CORRECTION

PATENT NO. : 4,694,388

DATED :

INVENTOR(S) : September 15, 1987
Walter Losel

It is certified that error appears in the above-identified patent and that said Letters Patent is hereby corrected as shown below:

IN THE CLAIMS

Claim 3, line 3      cancel "comprises a transformer."

line 4      cancel "former"

Signed and Sealed this

Thirty-first Day of January, 1989

Attest:

DONALD J. QUIGG

Attesting Officer      Commissioner of Patents and Trademarks